United States Patent [19]
Schweighofer

[11] Patent Number: 6,163,201
[45] Date of Patent: Dec. 19, 2000

[54] CIRCUIT FOR SUPPLYING A LOAD WITH A DIRECT VOLTAGE

[75] Inventor: Peter Schweighofer, Nuremberg, Germany

[73] Assignee: Siemens Aktiengesellschaft, Munich, Germany

[21] Appl. No.: 09/276,881

[22] Filed: Mar. 26, 1999

[30] Foreign Application Priority Data

Mar. 27, 1998 [DE] Germany ............................ 198 13 769

[51] Int. Cl.$^7$ .................................................. H03K 17/74
[52] U.S. Cl. ............................ 327/496; 327/531; 327/587
[58] Field of Search ........................... 323/282; 327/494, 327/496, 531, 532, 587, 588; 363/16, 17, 20, 21, 50, 74, 76, 78, 80, 81, 82, 89, 95, 97, 98, 124, 131, 132

[56] References Cited

U.S. PATENT DOCUMENTS

| 5,095,261 | 3/1992 | Schoofs ................................... 323/222 |
| 5,371,667 | 12/1994 | Nakao et al. ............................ 363/124 |
| 5,508,904 | 4/1996 | Hara .......................................... 363/21 |
| 5,550,458 | 8/1996 | Farrington et al. ...................... 323/222 |
| 5,563,781 | 10/1996 | Clauter et al. ........................... 363/124 |
| 5,574,636 | 11/1996 | Lee et al. ................................. 363/132 |
| 5,646,832 | 7/1997 | Pulhamus, Jr. et al. .................. 363/24 |
| 5,715,154 | 2/1998 | Rault ......................................... 363/89 |
| 5,861,734 | 1/1999 | Fasullo et al. ........................... 323/222 |
| 5,946,203 | 8/1999 | Jiang et al. ............................... 363/46 |
| 6,005,362 | 12/1999 | Enjeti et al. ............................ 318/479 |
| 6,028,776 | 2/2000 | Ji et al. ..................................... 363/21 |

FOREIGN PATENT DOCUMENTS

WO 96/19036  6/1996  WIPO .

*Primary Examiner*—Jeffrey Zweizig
*Attorney, Agent, or Firm*—Schiff Hardin & Waite

[57] ABSTRACT

In a circuit for supplying a load with a direct voltage, a diode is connected in a current path for supplying the load, a step-up converter is connected in the current paths parallel with the diode, and a control unit drives the step-up converter according to predetermined criteria in order to supply the load at least partially via the step-up converter. Such a circuit has advantageous power consumption characteristics. In comparison to conventional circuits that require an expensive filter, this circuit is more economical and/or has a smaller structural size.

18 Claims, 3 Drawing Sheets

CIRCUIT FOR SUPPLYING A LOAD WITH A DIRECT VOLTAGE

BACKGROUND OF THE INVENTION

1. Field of the Invention

The invention relates to a circuit for supplying a load with a direct voltage, in particular, for use in high-voltage power supply units, e.g. in the kW range. Such a power supply unit can, for example, be the power supply unit of a gradient amplifier or a resonance converter for a magnetic resonance tomograph apparatus, however, such a circuit is suitable for all other types of high-performance power supply units.

2. Description of the Prior Art

In order to supply a load with a direct voltage, the principle of rectification with capacitive smoothing is often applied. FIG. 1 shows, for example, a one-way rectifier in which a network alternating voltage $U_N$ is adjacent a diode 10 acting as a rectifier diode. The diode 10 conducts only when the network voltage $U_N$ is across positive than an output voltage $U_Z$ across to a smoothing capacitor 12. If the smoothing capacitor 12 is constructed sufficiently large, the power consumption from the network takes place only within a narrowly limited time on both sides of the maximum of the network voltage $U_N$. Current peaks thereby occur whose magnitude is in principle limited only by the network impedance. Such current peaks cause undesired harmonics in the network, and lead to a flattening of the network voltage $U_N$ in the region near the voltage maximum.

In order to reduce these undesired effects, the rectifier is conventionally not directly connected to the current network, but rather via a passive filter (not shown in FIG. 1). Such a filter limits and distributes the current consumption from the network. At the power values that are of interest here, a sufficiently dimensioned filter is large, heavy and expensive. In addition, it is expected that the relevant regulations of the electrical utility companies will become more stringent in the future, causing the required expense to increase further.

FIG. 2 shows a known rectifier bridge circuit for a three-phase current network. Three network input terminals 20, 20', 20" are connected respectively with rectifier branches via a filter 22. Each rectifier branch contains two diodes 24, 26; 24', 26'; 24", 26" connected in series with the same polarity. The three rectifier branches are connected in parallel and with a smoothing capacitor 28. Overall, the circuit according to FIG. 2 provides an output voltage $U_Z$ which is always at least as large as the largest difference between each two phases of the three-phase current network. The negative side of the output voltage $U_Z$ is at an output terminal 30, and the positive side of the output voltage $U_Z$ is at to an output terminal 32.

In this three-phase rectifier circuit as well, for the reasons already cited the filter 22 causes a considerable expense.

SUMMARY OF THE INVENTION

An object of the present invention is to provide a circuit for supplying a load with a direct voltage that has advantageous power consumption characteristics. In particular, it is an object to provide such a circuit that is more economical and/or has a smaller structural size than conventional circuits that require an expensive filter.

The invention is based on the fundamental concept of supplying the load not only via one or more rectifier diodes, but in addition via at least one step-up converter. As used herein, the term "step-up converter" means any circuit having an inductance and a switching element which uses the turn-off voltage surge of the inductance in order to achieve an output voltage that is higher in relation to an input voltage. With such a step-up converter, it is then possible to take power from a network phase even if the voltage of this phase (in relation to the lowest potential of the other phases) is lower than the output voltage. By this means, a more uniform network loading can be achieved.

According to the invention, the step-up converter is connected in parallel to the aforementioned diode in the current path in order to supply the load. This does not necessarily mean that these two components must be provided independently of one another. Rather, the diode can, besides its rectifier function, also serve as a component of the step-up converter.

In preferred constructions, the step-up converter is driven according to a supply voltage at the input side. The driving signals can have a predetermined frequency and/or pulse duration, however, these parameters can also be variable and can be controlled or regulated. In a relatively simple construction, the step-up converter is activated if the supply voltage is at a predetermined minimum level, and, moreover, is below a predetermined limit value. In addition, the step-up converter can be driven dependent on the output voltage of the circuit.

The step-up converter preferably is formed by can inductance (inductive component), a diode and a switching element. The inductance can be connected with the supply voltage via the switching element.

In a preferred embodiment, several diodes and several step-up converters are used, constructed and driven in the preferred manner described above.

The circuit contains a bridge rectifier circuit, however, alternatively the circuit can be already supplied with a pulsed direct voltage. The circuit is preferably designed for connection to a three-phase network with three phases or to an alternating voltage network with one phase and a directly grounded conductor.

DESCRIPTION OF THE PREFERRED EMBODIMENTS

Figure 1:
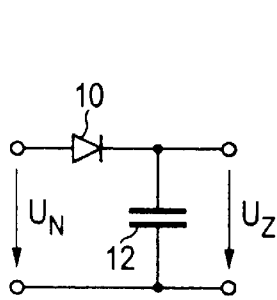
FIGS. 1 and 2, as noted above, show rectifier circuits according to the prior art.
Figure 2:
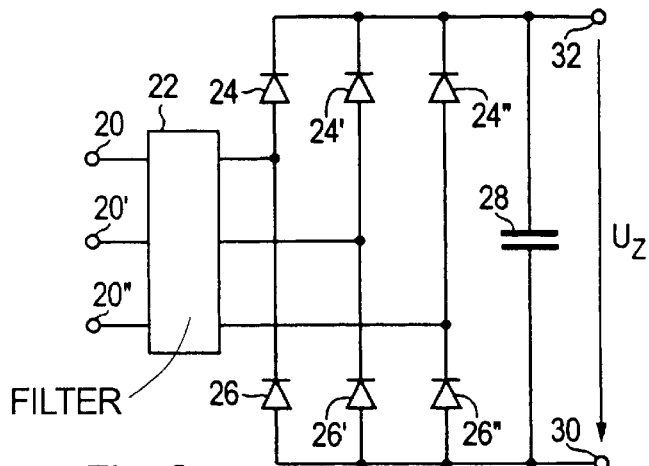
Figure 3:
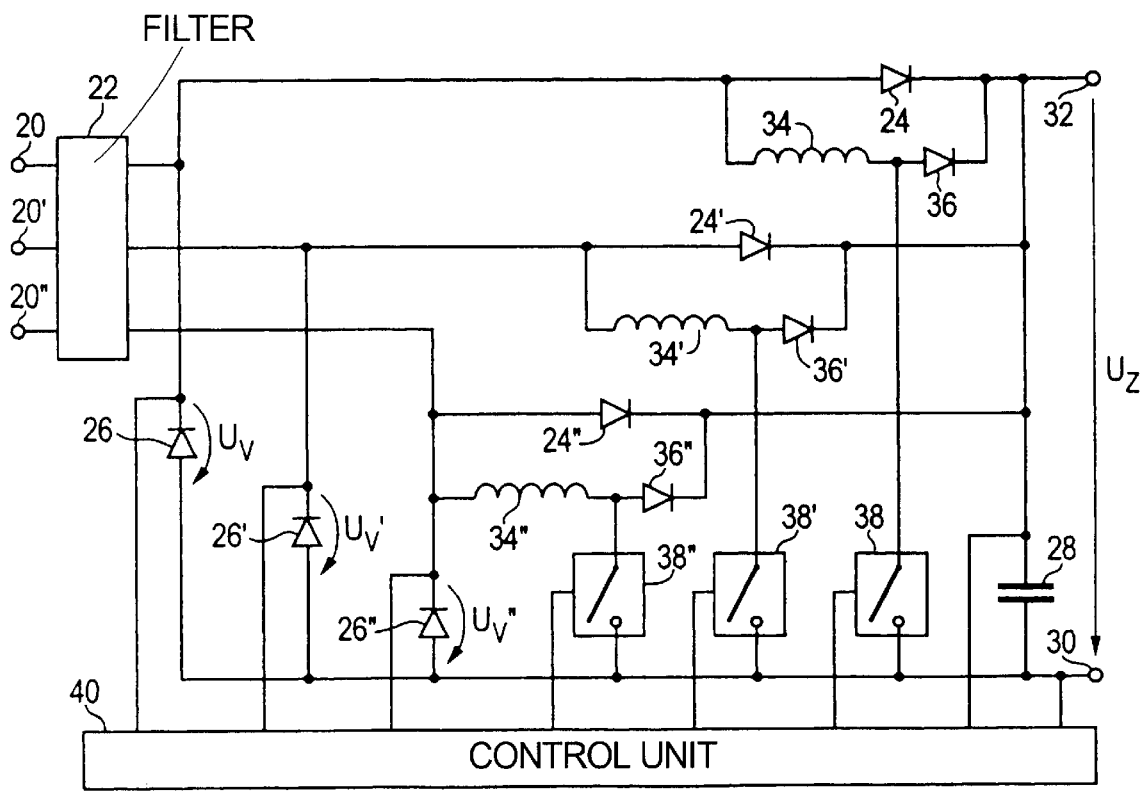
FIG. 3 shows a circuit diagram of the inventive circuit.

The circuits shown in FIG. 1 and FIG. 2 have already been described above. The circuit according to FIG. 3 is based on the known three-phase rectifier circuit according to FIG. 2. Here as well, three input terminals 20, 20', 20", a filter 22, three rectifier branches each formed from two diodes 24, 26; 24', 26'; 24", 26", and a smoothing capacitor 28 connected across output terminals 30, 32 are provided. These components are likewise connected as shown in FIG. 2, and thus form a rectifier circuit for the three-phase network voltage across to the input terminals 20, 20', 20". The filter 22 is known, and contains several inductances connected in the network lines, as well as several capacitors that are connected between the network phases and to ground.

An output voltage $U_Z$ is across a load that is formed by the smoothing capacitor 28 as well as from additional components not shown in FIG. 3. The load is supplied with power via several current paths. These current paths proceed respectively via the diodes 24, 24', 24". The circuit according to FIG. 3 can, for example, be provided in a power supply unit of a gradient amplifier. The output voltage $U_Z$ is then, for example, the intermediate circuit voltage of this power supply unit.

A step-up converter is connected in parallel with each of three diodes 24, 24', 24". Each step-up converter includes an inductance 34, 34', 34", a diode 36, 36', 36" connected in series therewith, and a switching element 38, 38', 38". In the step-up converter arranged parallel to the diode 24, a first terminal of the inductance 34 and a first terminal of the switching element 38 are connected with the anode of the diode 36. The second terminal of the inductance 34 is connected with the anode of the diode 24, and the cathodes of the two diodes 24 and 36 are connected together. The second terminal of the switching element 38 is connected with the negative pole of the output voltage $U_Z$, i.e. with the anodes of the three diodes 26, 26', 26" and with the output terminal 30. The two additional step-up converters are constructed correspondingly. As switching elements 38, 38', 38", MOSFETs or IGBTs or other electronic switches can be used for example.

A control 40 is provided for the production of switching signals for the three switching elements 38, 38', 38". As input values, the control units 40 picks off the supply voltages $U_V$, $U_{V'}$, $U_{V''}$ at to the diodes 26, 26', 26", as well as the output voltage $U_Z$. The negative pole of the output direct voltage $U_Z$, at the output terminal 30 serves as a common reference.

The circuit according to FIG. 3 can be used in several operating modes, according to the characteristics to be achieved. In a particularly simple operating mode, the switching elements 38, 38', 38" are operated by the control unit 40 with a constant switching frequency of several kilohertz (for example, 20 kilohertz). This switching frequency, the pulse duration, and the size of the inductances 34, 34', 34" are matched to one another. For example, when the switching element 38 is activated, the supply voltage $U_V$ is across to the inductance 34. In this time period, a current builds up in the inductance 34. When the switching element 38 is turned off, there arises a turn-off voltage surge. If the turn-off voltage is greater than $U_Z$, it is across to the load via the diode 36. By this means, the energy stored in the inductance 34 is provided to the load.

As a result, by means of this switching arrangement it is possible to take the required power much more uniformly than with a simple rectifier circuit. If, in an embodiment, the switch-on time of the switching elements 38, 38', 38" and the switching frequency are kept constant, the current consumption of a step-up converter from a network line is linear to the respective current network voltage. This corresponds to a purely ohmic characteristic.

In alternative embodiments, the step-up converters are activated only intermittently. In particular, embodiments are provided in which a step-up converter operates only when the supply voltage $U_V$, $U_{V'}$, $U_{V''}$, at to this step-up converter is smaller than a predetermined threshold voltage $U_S$. The threshold voltage $U_S$ can in particular be defined as a fraction of a peak voltage $\hat{U}$ of the current network.

Figure 4:
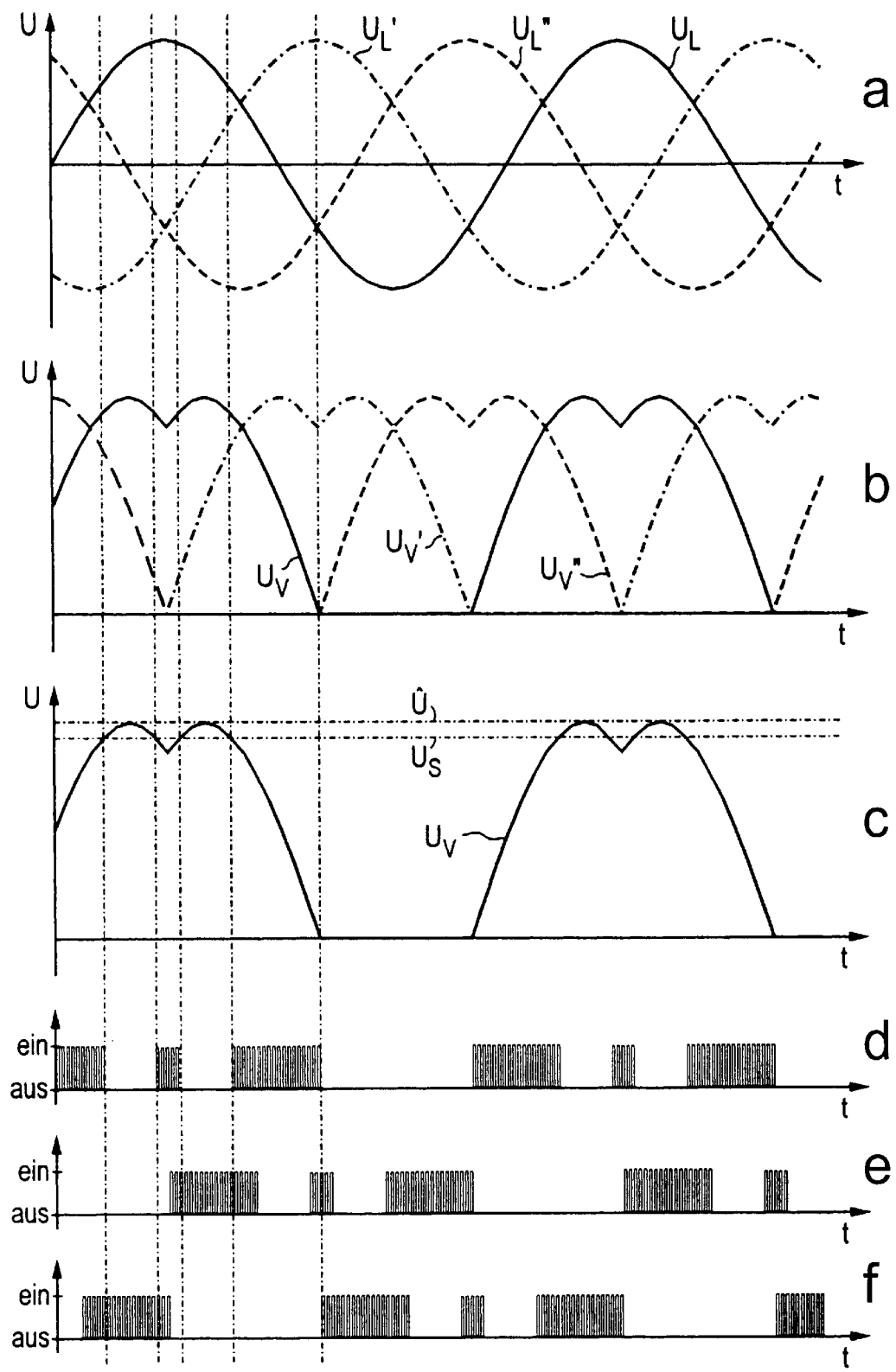
FIGS. 4 show voltage and drive signal curves during operation of the inventive circuit.

Such an embodiment is illustrated in FIG. 4 Diagram a shows sinusoidal voltage curves of the three-phase network phases $U_L$, $U_{L'}$, $U_{L''}$ in a representation symmetrical to a null voltage. In diagram b, the same voltage curves as in diagram a are shown, but as a reference voltage for each phase the respective lower value of the other two phases is always used. This corresponds to the supply voltages $U_V$, $U_{V'}$, $U_{V''}$ of FIG. 3. Diagram c shows, as examples, the supply voltage $U_V$, the threshold voltage $U_S$ and the peak voltage $\hat{U}$.

Diagram d shows the switching signals produced by the control units 40 for the switching element 38. From diagram d, it can be seen that the step-up converter allocated to the diode 24 is active only when the supply voltage $U_V$ is genuinely greater than 0 volts but is smaller than the threshold voltage $U_S$. This is also true for the other two step-up converters, as is shown in diagram e for the switching signal supplied to the switching element 38' and in diagram f for the switching signal supplied to the switching element 38".

In the embodiment just specified, the step-up converters do not operate at the precise time when the individual phase voltages $U_L$, $U_{L'}$, $U_{L''}$ reach their respective voltage maximum. By this means, even poor energy consumption characteristics of other consumers can be compensated.

In all specified embodiments, the power of the step-up converters can be limited to a part of the overall required power. For Example, given a power supply unit with 20 kW power, the three step-up converters can each be designed at 3 kW. In this case, the current consumption takes place only via the step-up converters, as long as the power consumption of the load is smaller than the efficiency thereof.

Figure 5A:
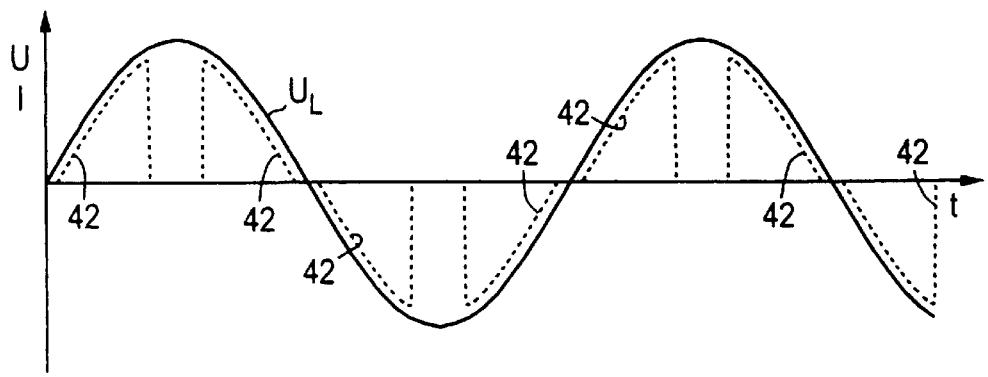
FIGS. 5a and 5b show voltage and current curves for a weak load and for a full load, respectively.

Weak load operation is shown schematically in FIG. 5a. The broken lines 42 indicate the flow of current through the step-up converters. During the negative half wave of the network phase $U_L$, the supply to the load of course does not take place via the step-up converter allocated to the diode 24, but rather via the other two step-up converters.

Figure 5B:
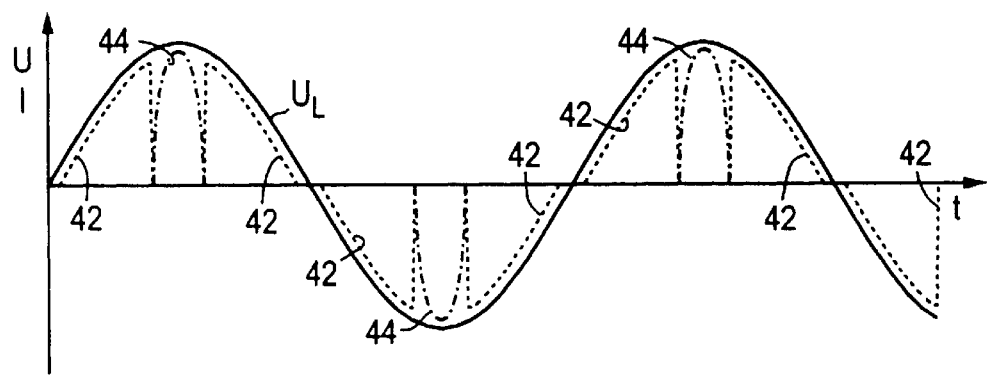

Given a higher power requirement, current over the normal rectification is additionally consumed. This current consumption takes place (as already depicted above) only during the maxima of the input voltages, i.e., at inherently undesirable times. However, since this current consumption relates only to the additionally required power, the current strengths that occur are smaller than without a step-up converter. For this reason, the filter 22 can be dimensioned relatively small. FIG. 5b shows such a full load operation, whereby the broken lines 44 indicate the peak load supplying by means of the rectifier diodes. The activation intervals of the step-up converters shown in FIG. 5a and FIG. 5b deviate from those according to FIG. 4d to FIG. 4f.

Figure 6:
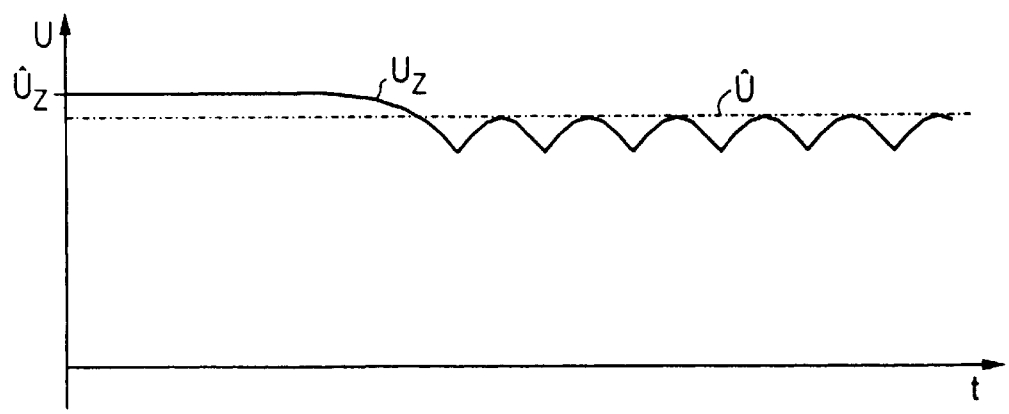
FIG. 6 shows an output voltage curves of the inventive circuit under weak load and full load conditions.

In addition, in all embodiments specified herein, a suitable no-load voltage regulation of the step-up converters is provided. FIG. 6 shows the output voltage $U_Z$ in a no-load or weak load operation (left half) and in a full load operation (right half). In no-load operation, the control means 40 ensures that a maximum output voltage $\hat{U}_Z$ is not exceeded. For this purpose, for example the pulse width of the drive signals for the switching elements 38, 38', 38" can be reduced, or the step-up converters can all be switched off together. In full load operation, the step-up converters influence the output voltage $U_Z$ only slightly, so that a similar ripple occurs as in the three-phase rectifier bridge shown in FIG. 2.

In further versions the frequency and/or the pulse duration (duty cycle) and/or other characteristics of the drive signals can be modified (regulated) according to the momentary operating state. By means of such control or regulation, particularly advantageous characteristics can be achieved with respect to current consumption and/or the output voltage and/or the load distribution within the circuit.

In further embodiments, the control units 40 drives, the switching elements 38, 38', 38" with a common clock. This results in a simpler circuit design. In alternative embodiments, clock signals offset to one another are provided for the switching elements 38, 38', 38", with the effective clock frequency being increased and the ripple is reduced.

Although modifications and changes can be made without significantly departing from the spirit and scope of this invention, it is the intention of the inventor that all such changes and modifications are covered by the appended claims.

I claim as my invention:

1. A circuit for supplying a load with a direct voltage, comprising:
   a three-phase rectifier bridge circuit comprising three rectifier branches, wherein each of said rectifier branches supplies a respective supply voltage to a respective current path for supplying said load,
   three step-up converters, each of said step-up converters being connected in parallel to a respective diode, each of said diodes being arranged in a respective one of said current paths for supplying said load, and
   a control unit connected to said step-up converters and driving said step-up converters according to predetermined criteria for supplying said load at least partially through said step-up converters.

2. A circuit as claimed in claim 1, wherein said control unit drives each of said step-up converters dependent on a respective one of said supply voltages.

3. A circuit as claimed in claim 2, wherein said control unit activates each step-up converter only when said respective one of said supply voltages is lower than a predetermined threshold voltage.

4. A circuit as claimed in claim 1, wherein each of said step-up converters comprises an inductive component, and a diode connected in series with said inductive component, and a switching element operated by said control unit for connecting said inductive component to said respective one of said supply voltages.

5. A circuit as claimed in claim 1, wherein said control unit is adapted for limiting an overall output voltage of said circuit to a predetermined maximum value under an operation selected from the group consisting of a no-load condition and a weak-load condition.

6. A circuit as claimed in claim 1, wherein said load comprises a gradient amplifier.

7. A circuit for supplying a load with a direct voltage, comprising:
   a bridge rectifier comprising a plurality of pairs of diodes, each of said pairs of diodes forming a respective rectifier branch, wherein each of said rectifier branches supplies a respective supply voltage to a respective current path for supplying said load,
   a step-up converter comprising an inductive component and a diode connected in series with said inductive component,
   a control unit connected to said step-up converter for driving said step-up converter according to predetermined criteria for supplying said load at least partially through said step-up converter, wherein
      said inductive component and said diode of said step-up converter are connected directly in parallel to one of said diodes of said bridge rectifier.

8. A circuit as claimed in claim 7, wherein said control unit drives said step-up converter dependent on that one of said supply voltages that is connected across that one of said current paths that is associated with said step-up converter.

9. A circuit as claimed in claim 8, wherein said control unit activates said step-up converter only when said one of said supply voltages is lower than a predetermined threshold voltage.

10. A circuit as claimed in claim 7, wherein said step-up converter further comprises a switching element through which said inductive component is connectable to that one of said supply voltages that is connected across that one of said current paths that is associated with said step-up converter.

11. A circuit as claimed in claim 7, wherein said control unit is adapted for limiting an overall output voltage of said circuit to a predetermined maximum value under an operation selected from the group consisting of a no-load condition and a weak-load condition.

12. A circuit as claimed in claim 7, wherein said load comprises a gradient amplifier.

13. A circuit for supplying a load with a direct voltage, comprising:
   a three-phase bridge rectifier that comprises:
      a first rectifier branch comprising a first pair of diodes and supplying a first supply voltage to a first current path for supplying said load,
      a second rectifier branch comprising a second pair of diodes and supplying a second supply voltage to a second current path for supplying said load, and
      a third rectifier branch comprising a third pair of diodes and supplying a third supply voltage to a third current path for supplying said load,
   a first step-up converter comprising a first inductive component and a first diode connected in series with said first inductive component, said first inductive component and said first diode being connected directly in parallel to one diode of said first pair of diodes of said bridge rectifier,
   a second step-up converter comprising a second inductive component and a second diode connected in series with said second inductive component, said second inductive component and said second diode being connected directly in parallel to one diode of said second pair of diodes of said bridge rectifier,
   a third step-up converter comprising a third inductive component and a third diode connected in series with said third inductive component, said third inductive component and said third diode being connected directly in parallel to one diode of said third pair of diodes of said bridge rectifier, and
   a control unit connected to said first, second and third step-up converters and driving said first, second and third step-up converters according to predetermined criteria for supplying said load at least partially through said first, second and third step-up converters.

14. A circuit as claimed in claim 13, wherein said control unit drives said first, second and third step-up converters dependent on the respective one of said first, second and third supply voltages.

15. A circuit as claimed in claim 14, wherein said control unit activates said first, second and third step-up converters only when said respective one of said first, second and third supply voltages is lower than a predetermined threshold voltage.

16. A circuit as claimed in claim 13, wherein said first step-up converter further comprises a first switching element through which said first inductive component is connectable to said first supply voltage, and said second step-up converter further comprises a second switching element through which said second inductive component is connectable to said second supply voltage, and said third step-up converter further comprises a third switching element through which said third inductive component is connectable to said third supply voltage.

17. A circuit as claimed in claim 13, wherein said control unit is adapted for limiting an overall output voltage of said circuit to a predetermined maximum value under an operation selected from the group consisting of a no-load condition and a weak-load condition.

18. A circuit as claimed in claim 13, wherein said load comprises a gradient amplifier.

* * * * *